United States Patent
Cornelissen et al.

(10) Patent No.: US 9,075,170 B2
(45) Date of Patent: Jul. 7, 2015

(54) OPTICAL ELEMENT

(75) Inventors: Hugo Johan Cornelissen, Eindhoven (NL); Maarten Marinus Johannes Wilhelmus Van Herpen, Eindhoven (NL); Liesbeth Van Pieterson, Eindhoven (NL)

(73) Assignee: KONINKLIJKE PHILIPS N. V., Eindhoven (NL)

( * ) Notice: Subject to any disclaimer, the term of this patent is extended or adjusted under 35 U.S.C. 154(b) by 43 days.

(21) Appl. No.: 13/393,558

(22) PCT Filed: Sep. 9, 2010

(86) PCT No.: PCT/IB2010/054065
§ 371 (c)(1),
(2), (4) Date: Mar. 1, 2012

(87) PCT Pub. No.: WO2011/033428
PCT Pub. Date: Mar. 24, 2011

(65) Prior Publication Data
US 2012/0163014 A1    Jun. 28, 2012

(30) Foreign Application Priority Data
Sep. 16, 2009   (EP) .................................... 09170438

(51) Int. Cl.
 *F21V 7/04* (2006.01)
 *H01L 33/00* (2010.01)
 (Continued)

(52) U.S. Cl.
CPC ............ *G02B 6/0006* (2013.01); *G02B 6/0018* (2013.01); *G02B 6/0055* (2013.01);
(Continued)

(58) Field of Classification Search
CPC .... G02B 6/001; G02B 3/0056; G02B 6/0018; G02B 6/0061; G02B 6/0033; G02B 6/0055; G02B 6/4214; G02F 1/133555; G02F 1/133605; F21V 5/00; F21V 2008/003
USPC .......... 362/551, 554–556, 558, 560; 442/301; 385/37, 38; 349/62, 65
See application file for complete search history.

(56) References Cited

U.S. PATENT DOCUMENTS 3,781,537 A * 12/1973 Ramsey ........................ 362/559
4,092,061 A *  5/1978 Stigliani, Jr. .................... 385/33
(Continued)

FOREIGN PATENT DOCUMENTS

GB         2239323 A    6/1991
WO      2004070464 A1    8/2004
(Continued)

OTHER PUBLICATIONS

C. H. Ho et al; "Multilayer-Incoupling-Structure Design for Ultra-Thin LED-Backlights", FMC5-vol. 4, International Display Workshop, IDW 2008, pp. 757-760.
(Continued)

*Primary Examiner* — John A Ward
*Assistant Examiner* — Alexander Garlen
(74) *Attorney, Agent, or Firm* — Yuliya Mathis

(57) ABSTRACT

It is disclosed an optical element (200) wherein one or more light-emitting diodes, LEDs, and additional optics may be provided in an integrated solution that may relatively easily be assembled and maintained in a desired position relatively each other. The optical element (200) may enable one or more LEDs and additional optics to be provided in an integrated solution that is relatively thin and compact in comparison with known devices, such that light from one or more LEDs may be injected into a thin light guide (205, 206) such as an optical fiber, an optical fiber array, a ribbon-shaped light-guiding structure, etc.

8 Claims, 8 Drawing Sheets

(51) Int. Cl.
| | |
|---|---|
| *F21V 11/00* | (2006.01) |
| *G02B 5/02* | (2006.01) |
| *H01P 5/00* | (2006.01) |
| *A45D 42/10* | (2006.01) |
| *G01D 11/28* | (2006.01) |
| *G09F 13/00* | (2006.01) |
| *G02B 6/26* | (2006.01) |
| *G02B 6/42* | (2006.01) |
| *F21V 8/00* | (2006.01) |
| *G02F 1/1335* | (2006.01) |
| *G02B 6/04* | (2006.01) |

(52) U.S. Cl.
CPC .......... *G02F1/133555* (2013.01); *G02B 6/001* (2013.01); *G02F 1/133605* (2013.01); *G02B 6/0023* (2013.01); *G02B 6/0026* (2013.01); *G02B 6/0031* (2013.01); *G02B 6/0076* (2013.01); *G02B 6/04* (2013.01); *G02B 6/4298* (2013.01)

(56) References Cited

U.S. PATENT DOCUMENTS

| | | | | |
|---|---|---|---|---|
| 4,234,907 A | * | 11/1980 | Daniel | 362/556 |
| 4,907,132 A | * | 3/1990 | Parker | 362/556 |
| 6,490,402 B1 | | 12/2002 | Ota | |
| 6,739,744 B2 | * | 5/2004 | Williams et al. | 362/552 |
| 6,826,335 B1 | * | 11/2004 | Grudinin et al. | 385/43 |
| 6,827,456 B2 | * | 12/2004 | Parker et al. | 362/629 |
| 6,915,039 B2 | | 7/2005 | Young et al. | |
| 7,144,830 B2 | * | 12/2006 | Hill et al. | 442/205 |
| 7,315,671 B2 | * | 1/2008 | Huck et al. | 385/18 |
| 7,432,649 B2 | | 10/2008 | West | |
| 7,907,804 B2 | * | 3/2011 | Meir et al. | 385/31 |
| 2002/0167624 A1 | | 11/2002 | Paolini | |
| 2004/0086223 A1 | | 5/2004 | Young et al. | |
| 2005/0280756 A1 | * | 12/2005 | Kim et al. | 349/114 |
| 2009/0003014 A1 | | 1/2009 | Jablonski | |
| 2009/0022315 A1 | | 1/2009 | Leung | |

FOREIGN PATENT DOCUMENTS

| | | |
|---|---|---|
| WO | 2006055140 A1 | 5/2006 |
| WO | 2006102846 A1 | 10/2006 |
| WO | 2007034432 A1 | 3/2007 |
| WO | 2008087883 A1 | 7/2008 |
| WO | 2009022284 A1 | 2/2009 |

OTHER PUBLICATIONS

C.H. Ho et al; "Design of Multilayer Incoupling Structures to Minimize the Thickness of LED-backlights and Luminaires", Technical Note PR-TN 2008/00257, 2008, pp. 1-69.

* cited by examiner

OPTICAL ELEMENT

FIELD OF THE INVENTION

The present invention generally relates to the field of lighting. In particular, the present invention relates to a light-emitting diode (LED) based optical element that for example may be utilized in a luminaire or as a light-emitting device on its own, incorporated in textile, etc.

BACKGROUND OF THE INVENTION

Light-emitting diodes intended for indication purposes have been used for a long time, but high-brightness LEDs, e.g. LEDs having a brightness that is high enough to enable general illumination of various locations such as rooms, have in a short period of time caused a significant growth in the LED and lighting applications market. High-brightness LEDs are generally associated with a small size, a relatively high efficacy (and associated low temperature), a relatively long lifetime, a wide color gamut and ease of control. Naturally, such LEDs are of importance to lighting designers in developing new lighting applications. Such LEDs may also be utilized in replacing conventional light generation devices, such as filamented light bulbs or halogen lamps. Such LEDs are also generally capable of emitting light of various colors. Thus, as the performance of LEDs improves and the costs of LEDs decreases, LEDs are expected to a significant degree replace conventional light sources such as incandescent lamps and fluorescent tubes. Furthermore, LEDs are in general compact compared to such conventional light sources.

For example, LEDs may be of such small size as to enable arrays of LEDs to be arranged on the surface of clothes, handbags, backpacks, furniture covering, carpets, window shades, curtains, etc.

To efficiently realize unobtrusive lighting solutions using such LEDs, not only are light sources having a relatively small size needed but also means for transporting light from the light source and distribute the light over a surface or throughout a volume. Light guides are known for spreading and transporting light. In general, light from a LED is injected into one side of the light guide and emerges from another side of the light guide by means of light extraction means. In order to inject light from a LED into a thin light guide, such as a thin optical fiber or a thin plastic sheet, the beam of light from the LED generally has to shaped appropriately, as a typical light-emitting area of a LED is about $1 \times 1$ mm$^2$, while a typical diameter of an optical fiber is about 100 µm and a typical thickness of a thin plastic sheet used as a light guide may be about 200 µm.

In particular in the field of beam shaping, new options of so-called secondary optics such as lenses and/or mirrors have become available where optical elements are positioned close to the LED for converting the emission pattern of the LED, which often is Lambertian, into another, desired pattern, such as a narrow cone-shape pattern. In general, such secondary optics are constituted by combinations of one or more LEDs and a separate optical beam-shaping element. Thus, two or more components in general have to be positioned in a desired position relatively each other in order to achieve the desired beam-shaping and be maintained in the desired position, accurately and securely. Such solutions may hence pose mechanical difficulties with regards to assembly and/or use.

In general, available secondary optics is relatively large, especially in comparison with the light-emitting area of a LED. A typical diameter of secondary optics may range from about 20 mm to about 50 mm, and the thickness of secondary optics may typically range from about 10 mm to about 20 mm, to be compared with the light-emitting area of a LED that is typically about $1 \times 1$ mm$^2$. Thus, such secondary optics are in general relatively bulky and/or obtrusive.

SUMMARY OF THE INVENTION

It is with respect to the above considerations and others that the present invention has been made. In particular, the inventors have realized that it would be desirable to achieve an optical element where one or more LEDs and additional optics may be provided in an integrated solution that may relatively easily be assembled and maintained in a desired position relatively each other. Furthermore, the inventors have realized that it would be desirable to achieve an optical element where one or more LEDs and additional optics may provided in an integrated solution that is relatively thin and compact in comparison with known devices, such that light from one or more LEDs may be injected into a thin light guide such as an optical fiber, an optical fiber array, a ribbon-shaped light-guiding structure, etc.

To better address one or more of these concerns, optical elements having the features defined in the independent claims is provided. Further advantageous embodiments of the present invention are defined in the dependent claims.

According to a first aspect of the present invention, there is provided an optical element comprising at least one light guide. The optical element comprises at least one LED and an optical coupler adapted to optically couple the at least one LED to at least one input surface portion of the at least one light guide. The optical coupler comprises at least one light-angle selecting transflector, adapted to at least partially reflect light incident on the at least one light-angle selecting transflector within a predetermined angle interval with respect to a surface normal of the at least one LED and at least partially transmit light incident on the at least one light-angle selecting transflector outside the predetermined angle interval.

In other words, the present invention is based on at least one LED optically coupled to at least one light guide by means of an optical coupler acting as an angular filter for light emitted from the at least one LED and being incident on the optical coupler. The inventors have realized that by such a configuration the at least one light guide may be relatively thin, typically down to about 30% of the side of the LED light-emitting surface (e.g., about 0.3 mm for a LED having a light-emitting area of about $1 \times 1$ mm$^2$) without substantial light losses, as described further in the following. This is in contrast to conventional secondary optics, which typically has a thickness that ranges from about 10 mm to about 20 mm.

The at least one light guide may for example comprise an elongate element adapted to guide light.

The predetermined angle interval may be such that light coupled into the at least one light guide satisfies a total internal reflection (TIR) condition at a surface portion of the at least one light guide. In other words, the light-angle selecting transflector may act as an angular filter such as to reflect light that will not fulfill the TIR condition in the light guide and transmit light that fulfils the TIR condition in the light guide, thereby enabling achieving a relatively high optical efficiency for the optical element. The latter light may then propagate through the light guide via TIR.

The elongate element adapted to guide light may for example comprise one or more of elements such as a wire, a tube, one or more individual fibers, a ribbon, a cable, etc. The particular choice of elements may be based on user, capacity, application and/or design requirements.

By means of such an optical coupler a relatively thin and compact assembly of a LED light redirection structure combined with one or more LEDs can be made, which assembly may be utilized for providing unobtrusive and/or ubiquitous illumination. Such an assembly, or an array of such assemblies, may for example be utilized in arrays of fibers (e.g., woven into such an array of fibers), for example textile, for providing unobtrusive and/or ubiquitous illumination sources in clothing, carpets, curtains, shades, furniture covering, etc.

Some or all of the components of the optical element may be coupled together by means of index matching adhesive, such as index matching silicone adhesive, which may provide optical contact, e.g. promoting light extraction from the at least one LED, eliminating optical Fresnel losses, etc., and at the same time providing mechanical stability of the assembly of components of the optical element.

The at least one LED may be configured to emit either red, green and blue light.

Optical coupling referred to in the foregoing and in the following with reference to some embodiments of the present invention may be realized in a number of ways, including bonded and non-bonded configurations. Optical coupling between elements or components may for example be achieved by means of a suitable adhesive, a (thin) optically conducting layer arranged between the elements or components that are to be optically coupled to each other, etc. Each such arrangement may have an appropriate index of refraction for index matching the elements or components that are to be optically coupled together.

According to a second aspect of the present invention, there is provided an optical element comprising at least two light guides. The optical element comprises at least one LED configured to emit white light. The at least one LED is optically coupled to at least one input surface portion of one of the at least one light guide. The optical element comprises at least one reflector. Each of the at least two light guides comprises an overlap surface portion adapted to optically couple the respective light guide to another light guide. Thus, the optical element comprises at least two overlap surface portions, the at least two overlap surface portions being arranged in a stacked configuration. The at least one reflector is coupled to the light guide that comprises the overlap surface portion that with respect to a stacking direction of the at least one overlap surface portion is located farthest away from the overlap surface portion of the light guide comprising the at least one input surface portion.

Each of the at least two light guides may for example comprise an elongate element adapted to guide light.

The at least one reflector may be specular.

An optical coupler comprising an angular filter such as described with reference to the first aspect of the present invention may be difficult to realize for the full spectral range of white light. In an optical element according to the second aspect of the present invention such an angular filter, designed to suppress light that does not fulfill TIR conditions in the light guide, is absent. However, by the reflector and its arrangement in relation to the at least one light guide and the at least one LED, light that does not fulfill TIR conditions in the light guide is prevented from directly leaving the light guide without propagating through the light guide via TIR. In this manner, the optical efficiency for the optical element according to the second aspect of the present invention may be at a level comparable to the optical efficiency for the optical element according to the first aspect of the present invention.

In other words, the feature of a reflector provides a solution to the problem of suppressing the light rays that do not meet TIR conditions in the light guide. This feature substantially corresponds to the feature of an optical coupler comprising at least one light-angle selecting transflector in the optical element according to the first aspect of the present invention. Thus, both the feature of a reflector and the feature of an optical coupler comprising at least one light-angle selecting transflector provide means for suppressing light rays that do not meet TIR conditions in the light guide. By means of these two features, the optical element according to the first and second aspect of the present invention, respectively, may provide a relatively thin, integrated optical element, in alternative manners.

Thus, the optical element according to the second aspect of the present invention provides an alternative advantageous solution to a problem that the optical element according to the first aspect of the present invention addresses, namely to achieve a relatively high optical efficiency for the optical element.

By means of an optical element according to the second aspect of the present invention, the same or similar advantages as the advantages of the optical element according to the first aspect of the present invention may be achieved.

Some or all of the components of the optical element according to the second aspect of the present invention may be coupled together by means of (optical) index matching adhesive, such as index matching silicone adhesive, which may provide optical contact, e.g. promoting light extraction from the at least one LED, eliminating optical Fresnel losses, etc., and at the same time providing mechanical stability of the assembly of components of the optical element.

In the context of some embodiments of the present invention, by a LED configured to emit white light it is referred to a LED capable of emitting white light across substantially the full spectral range of white light, such as a phosphor-converted blue LED.

In the context of some embodiments of the present invention and in relation to components coupled to each other, the term "coupled" is not limited to be construed as directly coupled, but also encompasses functional couplings having intermediate components. For example, on one hand, if an optical output of a first component is coupled to an input of a second component, this comprises a direct coupling. On the other hand, if a component directly supplies optical output from the first component to the input of the second component, alternatively via one or more additional components, the first and second component are also coupled.

According to a third aspect of the present invention, there is provided a light-emitting device comprising an optical element according to the first or the second aspect of the present invention or any embodiment thereof.

According to a fourth aspect of the present invention, there is provided an array of fibers comprising at least one optical element according to the first or the second aspect of the present invention or any embodiment thereof incorporated in the array.

Such fibers may for example comprise, or be, optical fibers.

Such an array of fibers may be incorporated into (e.g., woven into) cloth, fabric or the like, for example in so called "photonic textile", for transporting and distributing light in clothes, curtains, furniture covering, window shades, etc.

According to an exemplifying embodiment of the present invention, the optical element comprises at least two light guides. Each of the two light guides may be optically coupled to at least one of the other at an overlap surface portion, the overlap surface portions being arranged in a stacked configuration and at least two light guides being longitudinally extending in non-coinciding directions.

By such a configuration, one or more LEDs and additional optics may provided in an integrated solution that is relatively thin and compact and therefore may be employed singly or in combination for providing unobtrusive and/or ubiquitous illumination while embedded in various environments such as on the surface of clothes, handbags, backpacks, window shades, curtains, etc.

In view of the foregoing and depending on the particular user needs and/or application requirements, the at least one light guide may for example comprise a ribbon-shaped light-guiding structure. Alternatively or optionally, the at least one light guide may comprise a plurality of light-guiding fibers arranged substantially parallel to a longitudinal direction of the at least one light guide. Alternatively or optionally, the at least one light guide may comprise at least one light-guiding fiber arranged substantially parallel to a longitudinal direction of the at least one light guide. At least a portion of the at least one light-guiding fiber may comprise a substantially rectangular cross section in a longitudinal direction.

The at least one light guide may comprise a light guide comprising any combination of the configurations described immediately in the foregoing.

As indicated in the foregoing, one or more relatively thick light-guiding fibers having a generally circular cross section, wherein at least a portion of a light-guiding fiber has been locally smoothly deformed into a substantially rectangular cross section, may be employed. For example, a rectangle having a width W and height H can be deformed into a circle having a radius $R=[HW/\pi]^{0.5}$, and vice versa. The inventors have realized that such a configuration may have a beneficial collimating effect on the beam shape of light subsequently coupled out from the light guide.

The at least one input surface portion may be aligned with the overlap surface portion of the respective light guide.

The at least one light guide may comprise a plurality of light-guiding fibers arranged substantially parallel to a longitudinal direction of the at least one light guide, wherein a cross section in a longitudinal direction of at least one of the light-guiding fibers has a different size and/or shape compared to the cross section in a longitudinal direction of other light-guiding fibers.

Such a configuration may enable reducing geometrical optical losses. For example, consider a case where each of the plurality of light-guiding fibers has a substantially circular cross section in a longitudinal direction. When these light-guiding fibers are arranged side by side in an array there will inevitably be some blank or empty space between adjacent light-guiding fibers, which space generally cannot be used for guiding light. By providing light-guiding fibers having different cross sections in a longitudinal direction in the array, the amount of blank space between adjacent light-guiding fibers may be reduced and thus the geometrical optical losses may be reduced.

According to an exemplifying embodiment of the present invention, at least two light guides comprised in the optical element may be extending longitudinally in directions that are orthogonal with respect to each other. In this manner, the integrated solution comprising one or more LEDs and additional optics may relatively easy be combined with other optical elements, for example in order to create a network of inter-connected optical elements. Thus, by such a configuration the building or construction of such a network of inter-connected optical elements may be facilitated.

The optical element may comprise a first specular reflector coupled to the light guide that comprises the overlap surface portion that with respect to a stacking direction of the overlap surface portions is located farthest away from the overlap surface portion of the light guide comprising the at least one input surface portion.

Such a configuration may enable an increased suppression of light rays that do not meet TIR conditions in the light guide that the first specular reflector is coupled to. In case an angular filter such as has been described in the foregoing is present in the optical element, the first specular reflector may not be required for suppression of light rays that do not meet TIR conditions in the light guide that the first specular reflector is coupled to, as the angular filter in general only transmits light that fulfils a TIR condition in the light guide. However, such a first specular reflector may additionally improve robustness and/or mechanical stability of the optical element.

The first specular reflector may be coupled to a surface portion facing the overlap surface portion of the light guide that the first reflector is coupled to. In this manner, the first specular reflector may be aligned with the at least one input surface portion, which in turn may increase the efficiency in suppression of light rays that do not meet TIR conditions in the light guide that the first specular reflector is coupled to.

The optical element may comprise at least one lateral specular reflector coupled to at least one lateral side surface of the at least one light guide. In this manner, the lateral optical loss of light by light escaping through a lateral side surface of the at least one light guide may be reduced. In turn, this may enable the optical efficiency of the optical element to be improved.

According to an exemplifying embodiment of the present invention, the at least two light guides are longitudinally extending in non-coinciding directions.

The at least one reflector may be coupled to a surface portion facing the overlap surface portion of the light guide that the at least one reflector is coupled to. In this manner, the at least one reflector may be aligned with the at least one input surface portion of one of the at least one light guide, which in turn may increase the efficiency in suppression of light rays that do not meet TIR conditions in the light guide that the at least one reflector is coupled to.

The optical element may comprise at least one retroreflector (sometimes referred to as a retroreflector). In the context of some embodiments of the present invention, by a retroreflector it is meant a device that reflects light back into the direction of incidence of the light with a minimum scattering of light.

Such a retroreflector may be employed to facilitate suppression of light rays that do not meet TIR conditions in the light guide. Light rays incident on the retroreflector surface facing the light guide may be sent back into the light guide and subsequently the light may be re-scattered at the microscopically rough surface of the LED.

Such retroreflectors may for example comprise one or more micro-pyramid arrays or one or more arrays of micro-semispheres having a relatively high refractive index.

At least one light guide in the optical element may comprise an output surface portion optically coupled to, or arranged adjacent to, at least one light extractor.

The arrangement of a first component or element adjacent to a second component or element as referred to in the foregoing and in the following with reference to some embodiments of the present invention means that the first component and the second component, or surface portions of the first and second component, respectively, are not in direct contact with each other but separated from each other by a suitable material or medium, e.g. by a slit of air. Such a separation may be small in comparison with dimensions of the first and/or the second component.

Further objects and advantages of the present invention are described in the following by means of exemplifying embodiments.

It is noted that the invention relates to all possible combinations of features recited in the claims.

BRIEF DESCRIPTION OF THE DRAWINGS

Exemplifying embodiments of the invention will be described below with reference to the accompanying drawings, in which.

In the accompanying drawings, the same reference numerals denote the same or similar elements throughout the views.

DETAILED DESCRIPTION

The present invention will now be described more fully hereinafter with reference to the accompanying drawings, in which exemplifying embodiments of the invention are shown. This invention may however be embodied in many different forms and should not be construed as limited to the embodiments set forth herein; rather, these embodiments are provided by way of example so that this disclosure will be thorough and fully convey the scope of the invention to those skilled in the art. Furthermore, like numbers refer to like or similar elements or components throughout.

Figure 1A:
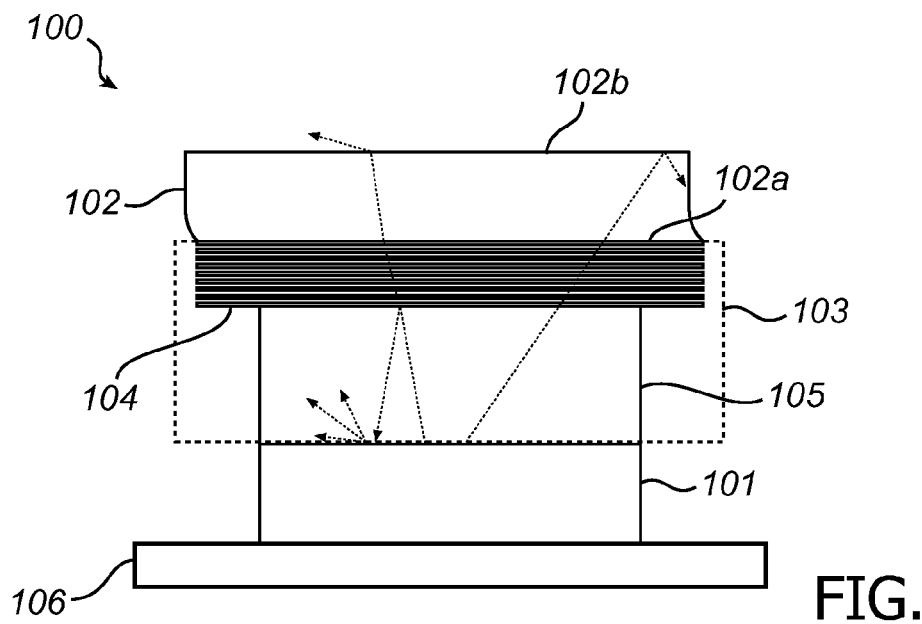
FIG. 1A is a schematic view of a portion of an optical element according to an exemplifying embodiment of the present invention.

Referring now to FIG. 1A, there is shown a schematic view of a portion of an optical element 100. The optical element 100 comprises a LED 101 coupled to an input surface portion 102a of a light guide 102 by means of an optical coupler, generally referenced by the dashed rectangle indicated by the reference numeral 103, which optical coupler 103 comprises at least one light-angle selecting transflector 104, for example constituted by a plurality of dielectric layers such as indicated in FIG. 1A. As further indicated in FIG. 1A, FIG. 1A shows a portion of the light guide 102 and a portion of the light-angle selecting transflector 104.

The light-angle selective transflector 104 and the LED 101 may be coupled together by means of a layer 105 of index matching adhesive, such as index matching silicone adhesive, comprised in the optical coupler 103.

The light-angle selecting transflector 104 is adapted to at least partially reflect light incident on the light-angle selecting transflector 104 (of which light some light ray paths are shown in FIG. 1A) within a predetermined angle interval with respect to a surface normal of the LED 101 and at least partially transmit light incident on the light-angle selecting transflector 104 outside the predetermined angle interval. With a surface normal of the LED 101 it is here meant a normal to a light-emitting surface of the LED 101 where the light-emitting surface faces the optical coupler 103. In other words, the light-angle selecting transflector 104 of the optical coupler 103 may act as an angular filter, reflecting light rays having a small angle of incidence, below some predetermined angle of incidence, back into the LED 101, whereas light rays having a large angle of incidence, above the predetermined angle of incidence, may be transmitted into the light guide 102.

The LED 101 may be mounted on a support 106, for example comprising a printed circuit board (PCB) or the like.

The predetermined angle interval may be such that light coupled into the at least one light guide 102 satisfies a total internal reflection (TIR) condition at an output surface portion 102b of the light guide. In other words, the multilayer angular filter 104 may reflect light that will not fulfill the TIR condition in the light guide 102, and transmit light that fulfils the TIR condition in the light guide 102. The latter light may then propagate through the light guide 102 via TIR and be coupled out for example by means of one or more outcoupling elements and/or a light extractor (not shown in FIG. 1A).

Figure 1B:
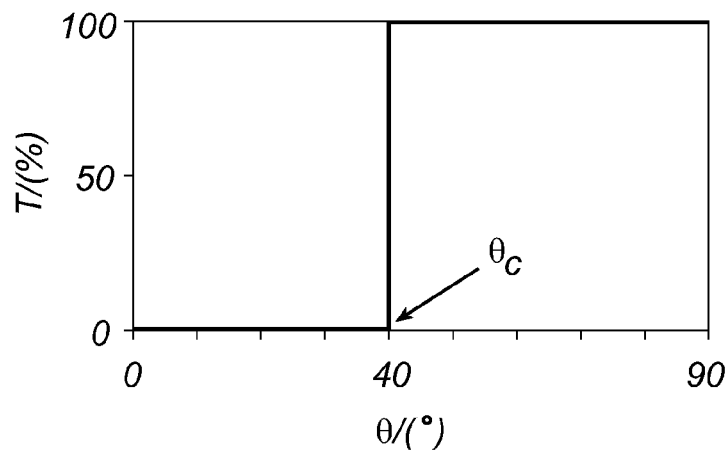
FIG. 1B is a graph of the transmissivity of a light-angle selective transflector in accordance with an exemplifying embodiment of the present invention, as a function of the angle of incidence of light incident on the light-angle selective transflector.

Referring now to FIG. 1B, there is shown a graph of the transmissivity of a light-angle selective transflector or multilayer angular filter 104 in accordance with an exemplifying embodiment of the present invention, as a function of the angle of incidence $\theta$ of light incident on the multilayer angular filter 104. As described in the foregoing, light having an angle of incidence $\theta$ below some predetermined angle $\theta_c$ is reflected and light having an angle of incidence $\theta$ above $\theta_c$ is transmitted through the multilayer angular filter 104. The particular value of $\theta_c$ shown in FIG. 1B is by way of example only.

With further reference to FIG. 1A, there is in general a minimum thickness requirement that the light guide 102 needs to fulfill in order to prevent the light entering the light guide 102 from reflecting from a top surface of the light guide 102 (the top surface generally facing the input surface portion 102a of the light guide 102) back into the LED 101. For example, according to a first geometrical estimate the minimum thickness for a LED having a light-emitting area of about 1×1 mm² would be about 0.79 mm.

Figure 1C:
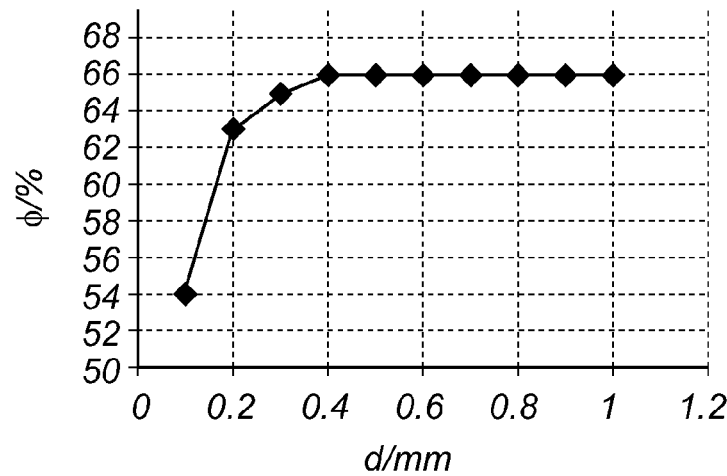
FIG. 1C is a graph illustrating a working principle in accordance with an exemplifying embodiment of the present invention.

Referring now to FIG. 1C, there is shown a graph for illustrating the efficiency of incoupling of light generated by a LED to the light guide via a light-angle selective transflector (such as a dielectric multilayer angular filter as discussed in the foregoing) as a function of the thickness d of the light guide. More precisely, the graph in FIG. 1C shows the relative light flux $\Phi$ leaving the optical element (that is, the ratio of the light flux leaving the optical element and the total light flux from the light-emitting area of the LED) versus the thickness d of the light guide. The graph shown in FIG. 1C was obtained by means of optical modeling, with the assumptions that the light-emitting area of the LED was 1×1 mm² and the reflectivity of the LED was 65%. As can be seen in FIG. 1C, the thickness d of the light guide may be reduced substantially below the first estimate 0.79 mm without significant efficiency reductions.

Figure 2A:
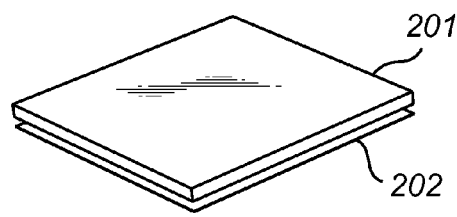
FIG. 2A is a schematic perspective view of components of an optical element in accordance with an exemplifying embodiment of the present invention.

Referring now to FIG. 2A, there is shown a schematic perspective view of components of an optical element in accordance with an exemplifying embodiment of the present invention, comprising a light-angle selecting transflector 201, or multilayer angular filter, optically coupled to a LED 202 (of which LED 202 only the light-emitting surface thereof is shown in FIG. 2A).

Figure 2B:
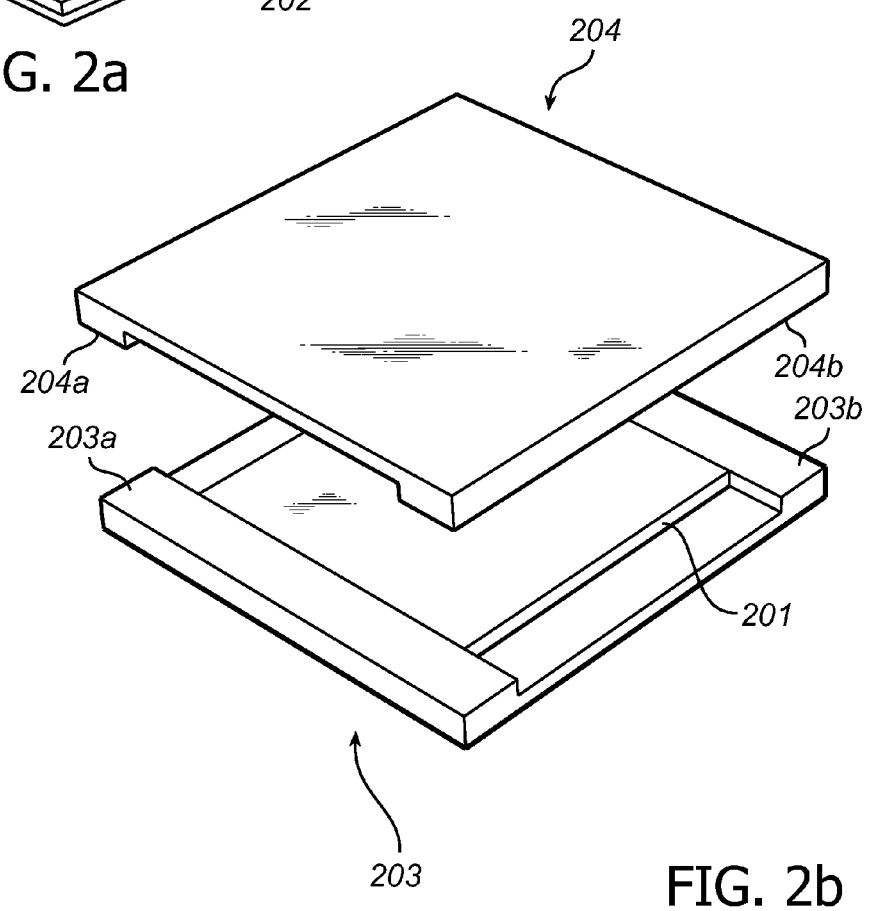
FIG. 2B is a schematic exploded perspective view of components of an optical element in accordance with an exemplifying embodiment of the present invention.

Referring now to FIG. 2B, there is shown a schematic exploded perspective view of components of an optical element in accordance with an exemplifying embodiment of the present invention. As also depicted in FIG. 2A, the optical element may comprise a light-angle selecting transflector 201, or multilayer angular filter, optically coupled to a LED (not shown in FIG. 2B, see FIG. 2A). The optical element may comprise a bottom reflector 203 and/or a top reflector 204. As depicted in FIG. 2B, the bottom reflector 203 and the top reflector 204 may each comprise lateral surface portions 203a, 203b and 204a, 204b, respectively, for reflecting light escaping from lateral side surfaces of light guides, constituted by elongate elements adapted to guide light (not shown in FIG. 2B, see FIGS. 2C and/or 2D), of the optical element, see FIGS. 2C and/or 2D and the following description.

Figure 2C:
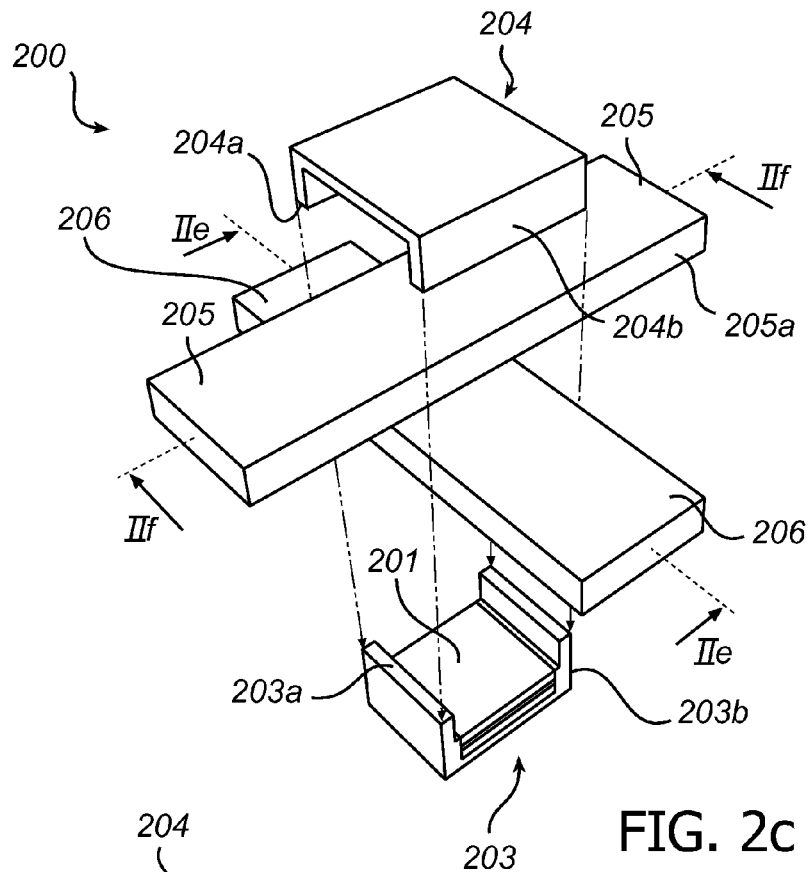
FIG. 2C is a schematic exploded perspective view of an optical element according to an exemplifying embodiment of the present invention.

Referring now to FIG. 2C, there is shown a schematic exploded perspective view of an optical element 200 according to an exemplifying embodiment of the present invention. As shown in FIG. 2C, the optical element 200 may comprise a light-angle selecting transflector or multilayer angular filter 201, optically coupled to a LED (not shown in FIG. 2C, see FIG. 2A). The optical element 200 may comprise a bottom reflector 203 and/or a top reflector 204. As depicted in FIG. 2B, the bottom reflector 203 and the top reflector 204 may each comprise lateral surface portions 203a, 203b and 204a, 204b, respectively, for reflecting light escaping from lateral side surfaces of light guides 205, 206, respectively.

Each of the light guides 205, 206 may for example comprise a ribbon-shaped light-guiding structure.

As shown by way of example in FIG. 2C, the light guides 205, 206 may extend longitudinally in directions that are non-coinciding, for example being orthogonal with respect to each other.

Figure 2D:
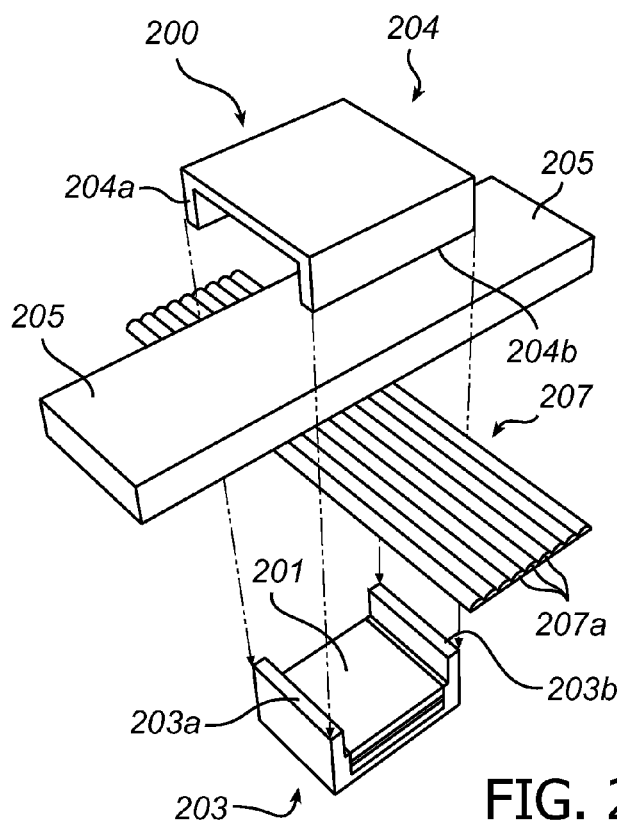
FIG. 2D is a schematic exploded perspective view of an optical element according to an exemplifying embodiment of the present invention.

Referring now to FIG. 2D, there is shown a schematic exploded perspective view of an optical element 200 according to an exemplifying embodiment of the present invention. The components of the optical element 200 described with reference to FIG. 2D indicated by the same reference numerals as depicted in FIG. 2C are similar or identical to the components indicated by the respective reference numerals in FIG. 2C. In contrast to the optical element 200 described with reference to FIG. 2C, the optical element 200 depicted in FIG. 2D comprises a light guide 207 comprising a plurality of light-guiding fibers 207a (of which only a few are indicated by reference numerals in FIG. 2D) arranged substantially parallel to a longitudinal direction of the light guide 207.

As shown by way of example in FIG. 2D, the light guides 205, 207 may extend longitudinally in directions that are orthogonal with respect to each other.

Although the exemplifying embodiments of the present invention described herein comprises one light guide or two light guides, this is not meant to limit the present invention, which rather encompasses embodiments comprising any number of light guides, depending on user needs and/or application requirements, for example three, four, five, six, eight or ten light guides.

Figure 2E:
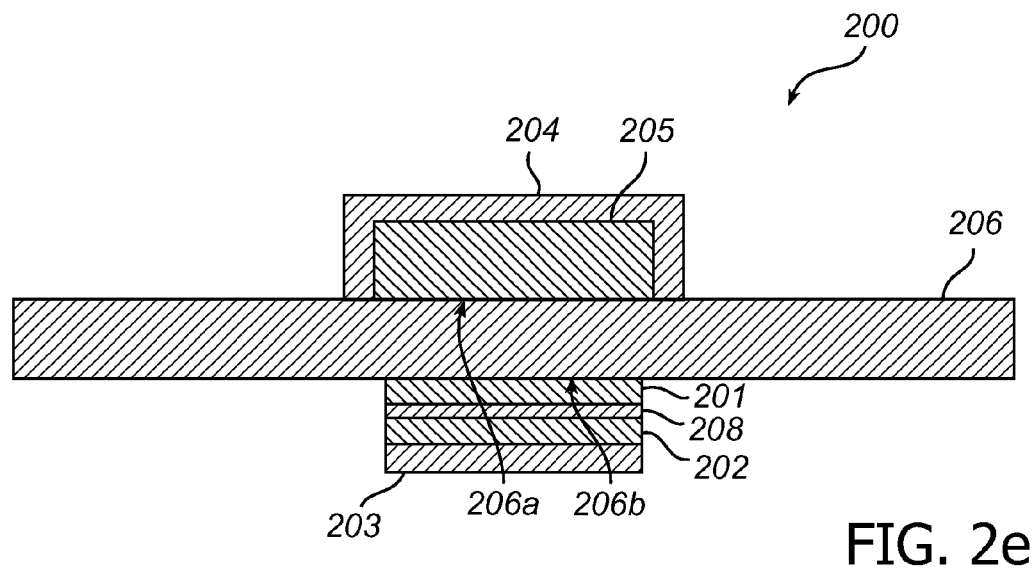
FIG. 2E is a schematic cross sectional view of the optical element shown in FIG. 2C along a longitudinal direction of one of the two light guides.

Referring now to FIG. 2E, there is shown a schematic cross sectional view of the optical element 200 described with reference to FIG. 2C. The view is along a longitudinal direction of the light guide 205. The components of the optical element 200 described with reference to FIG. 2E indicated by the same reference numerals as depicted in FIG. 2C are similar or identical to the components indicated by the respective reference numerals in FIG. 2C. As shown by way of example in FIG. 2E, the LED 202 may be optically coupled to the light-angle selective transflector 201 by means of a layer 208 of index matching adhesive, such as index matching silicone adhesive. The light-angle selective transflector 201 is optically coupled to an input surface portion 206b of the light guide 206.

With further reference to FIG. 2E, each of the two light guides 205, 206 may be optically coupled to the other at overlap surface portions 205a, 206a on the light guides 205, 206, respectively. As depicted in FIG. 2E, the overlap surface portions 205a, 206a may be arranged in a stacked configuration, one on top of the other and coupled thereto at the respective overlap surface portion 205a, 206a.

Figure 2F:
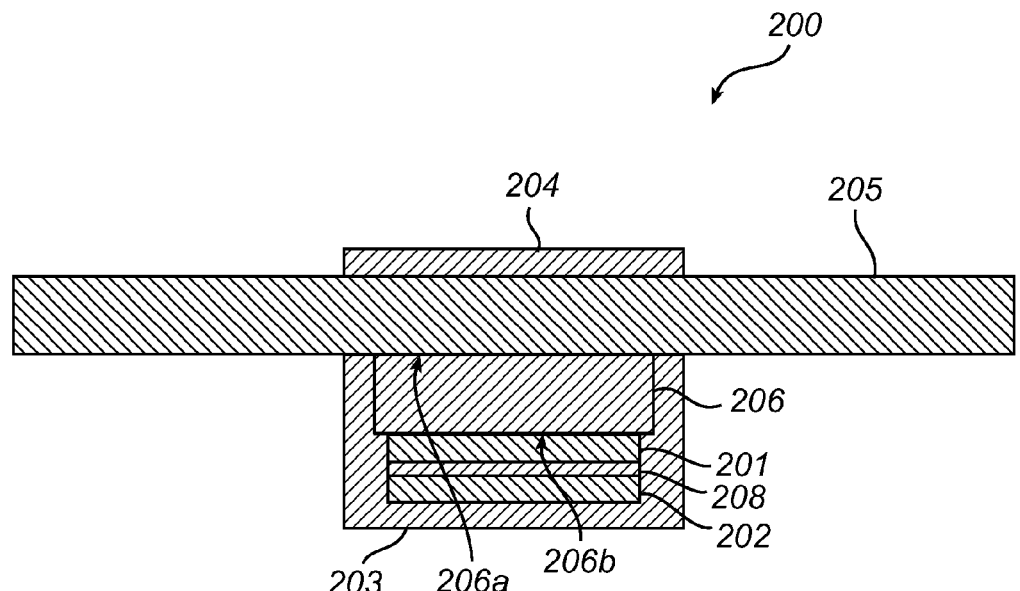
FIG. 2F is a schematic cross sectional view of the optical element shown in FIG. 2C along a longitudinal direction of the other light guide.

Referring now to FIG. 2F, there is shown a schematic cross sectional view of the optical element 200 described with reference to FIG. 2C. The view is along a longitudinal direction of the light guide 206. The components of the optical element 200 described with reference to FIG. 2F indicated by the same reference numerals as depicted in FIG. 2C are similar or identical to the components indicated by the respective reference numerals in FIG. 2C.

Figure 3A:
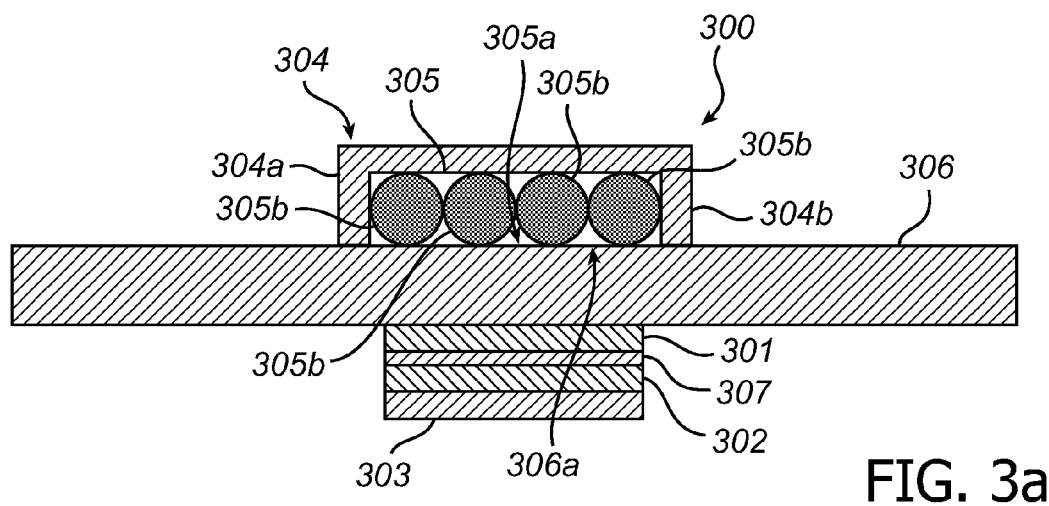
FIG. 3A is a schematic cross sectional view of an optical element according to an exemplifying embodiment of the present invention.

Referring to FIG. 3A, there is shown a schematic cross sectional view of an optical element 300 according to an exemplifying embodiment of the present invention. The view is along a longitudinal direction of a light guide 305 comprised in the optical element 300 (see below). As shown in FIG. 3A, the optical element 300 may comprise a light-angle selecting transflector 301, or multilayer angular filter, optically coupled to a LED 302. The optical element 300 may comprise a bottom reflector 303 and/or a top reflector 304, similar to the bottom reflector 203 and the top reflector 204 described with reference to FIG. 2C.

With further reference to FIG. 3A, the optical element 300 may comprise two light guides 305, 306 constituted by elongate elements adapted to guide light. Each of the two light guides 305, 306 may be optically coupled to the other at overlap surface portions 305a, 306a on the light guides 305, 306, respectively. As depicted in FIG. 3A, the overlap surface portions 305a, 306a may be arranged in a stacked configuration, one on top of the other and coupled thereto at the respective overlap surface portion 305a, 306a. As shown by way of example in FIG. 3A, the light guides 305, 306 may extend longitudinally in directions that are orthogonal with respect to each other.

As shown by way of example in FIG. 3A, the LED 302 may be optically coupled to the light-angle selective transflector 301 by means of a layer 307 of index matching adhesive, such as index matching silicone adhesive.

According to the embodiment depicted in FIG. 3A, the light guide 305 may comprise a plurality of light guiding fibers 305b arranged substantially parallel to a longitudinal direction of the light guide 305. As shown by way of example in FIG. 3A, the light-guiding fibers 305b may comprise a substantially circular cross section.

In accordance with the embodiment depicted in FIG. 3A, the light guide 306 comprises a ribbon-shaped light-guiding structure.

Regions between adjacent light-guiding fibers 305b in the light guide 305 may comprise index matching adhesive, such as index matching silicone adhesive.

Figure 3B:
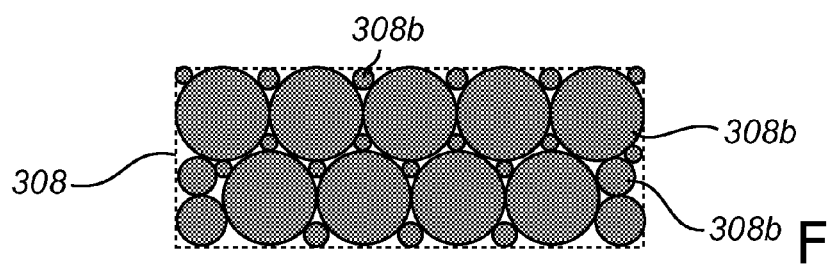
FIG. 3B is a schematic cross sectional view of a light guide in accordance with an exemplifying embodiment of the present invention along a longitudinal direction of the light guide.

Referring now to FIG. 3B, there is shown a schematic cross sectional view of a light guide 308 in accordance with an exemplifying embodiment of the present invention. The view is along a longitudinal direction of the light guide 308. In accordance with the embodiment depicted in FIG. 3B, the light guide 308 comprises a plurality of light guiding fibers 308b arranged substantially parallel to a longitudinal direction of the light guide 308, wherein cross sections in a longitudinal direction of the light-guiding fibers 308b have different sizes. By the mixing of light guiding fibers 308b with cross sections having different sizes in the light guide 308, the amount of blank or empty space between adjacent light-guiding fibers 308b, which blank or empty space may not be useful for guiding light, may be reduced. In this manner, the geometrical optical losses of the optical element may be reduced.

Not only the size of the cross sections may be varied for the light guiding fibers comprised in the light guide 308, but alternatively or optionally the shape of the cross sections may be varied (not shown in FIG. 3B) for the purpose of reducing the amount of blank or empty space between adjacent light-guiding fibers 308b.

Figure 3C:
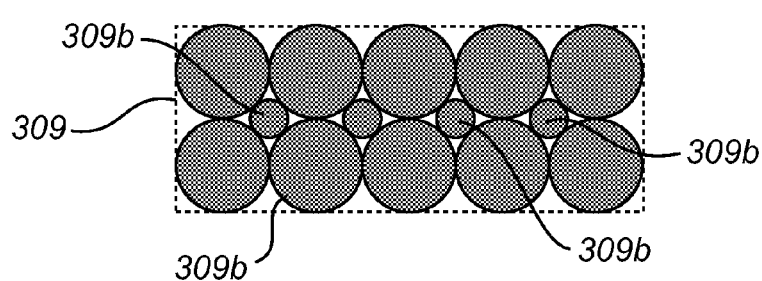
FIG. 3C is a schematic cross sectional view of a light guide in accordance with an exemplifying embodiment of the present invention along a longitudinal direction of the light guide.

Referring now to FIG. 3C, there is shown a schematic cross sectional view of a light guide 309 in accordance with an exemplifying embodiment of the present invention along a longitudinal direction of the light guide 309. In FIG. 3C there is depicted an exemplifying configuration of light guiding fibers 309b comprised in the light guide 308.

Figure 4A:
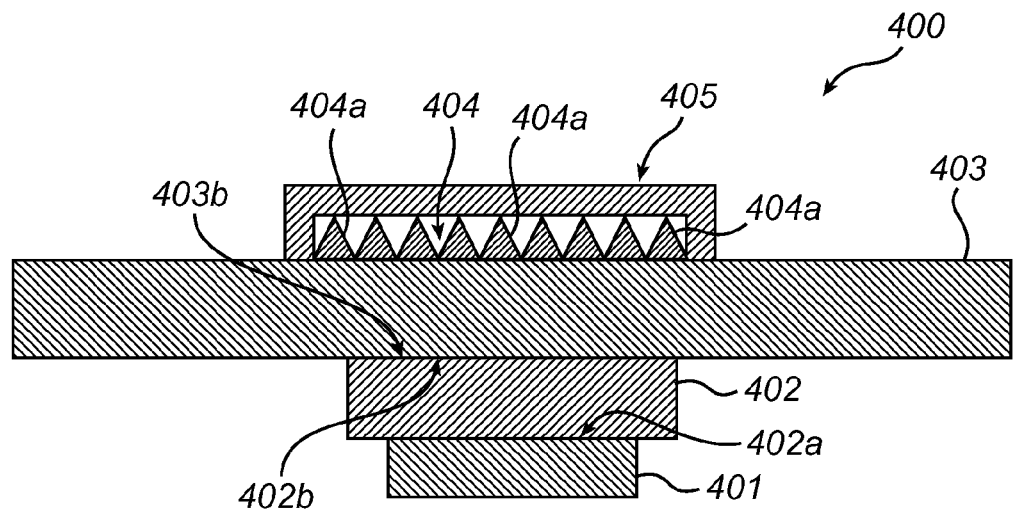
FIGS. 4A and 4B are schematic cross sectional views of optical elements according to exemplifying embodiments of the present invention.

With reference to FIG. 4A, there is shown a schematic cross sectional view of an optical element 400 according to an exemplifying embodiment of the present invention. The optical element 400 comprises a LED 401 optically coupled to a light guide 402 comprising a ribbon-shaped light-guiding structure at an input surface portion 402a of the light guide 402. In accordance with the depicted embodiment, the optical element 400 may further comprise another light guide 403 comprising a ribbon-shaped light-guiding structure. The light guides 402, 403 may be optically coupled to each other at overlap surface portions 402b, 403b on the light guides 402, 403, respectively, the overlap surface portions 402b, 403b being arranged in a stacked configuration.

The view in FIG. 4A is along a longitudinal direction of the light guide 402. As indicated in FIG. 4A, the light guides 402, 403 may be arranged such that the light guides 402, 403 are longitudinally extending in non-coinciding directions, for example in directions that are orthogonal with respect to each other.

With further reference to FIG. 4A, the optical element 400 may comprise a retroreflector 404 arranged on the light guide 403. On top of the retroreflector 404 a specular reflector 405 may be arranged. The retroreflector 404 may comprise a micro-pyramid array comprising a plurality of micro-pyramids 404a (of which only some are indicated by reference numerals in FIG. 4A).

Figure 4B:
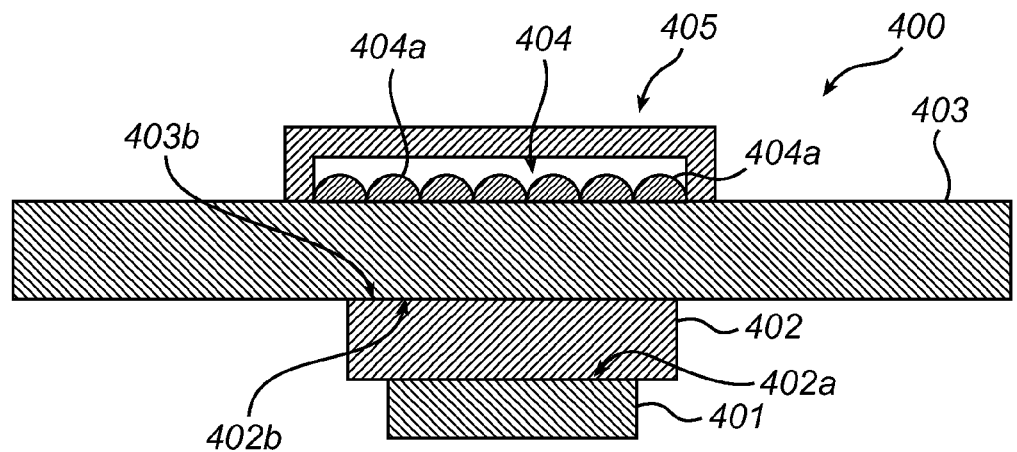

Alternatively or optionally, such a retroreflector 404 may comprise a micro-semisphere array comprising a plurality of micro-semispheres 404a having a relatively high refractive index (see FIG. 4B).

Figure 5A:
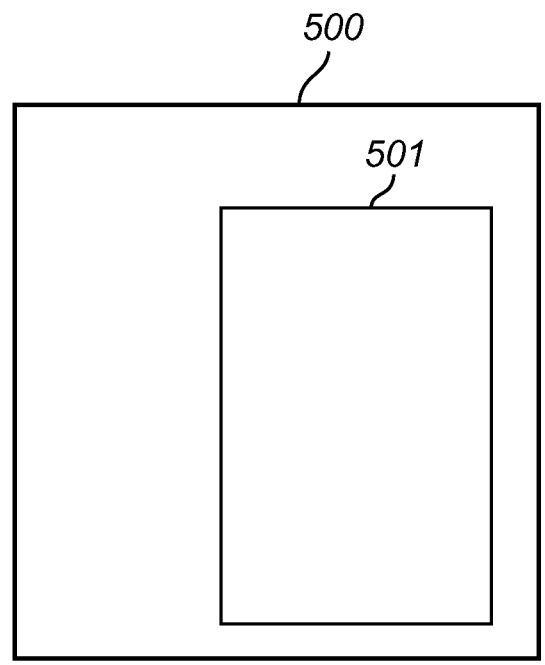
FIG. 5A is a schematic block diagram of a light-emitting device according to an exemplifying embodiment of the present invention.

Referring to FIG. 5A, there is shown a schematic block diagram of a light-emitting device 500 according to an exemplifying embodiment of the present invention. The light-emitting device 500 comprises an optical element 501 according to an embodiment of the present invention.

Figure 5B:
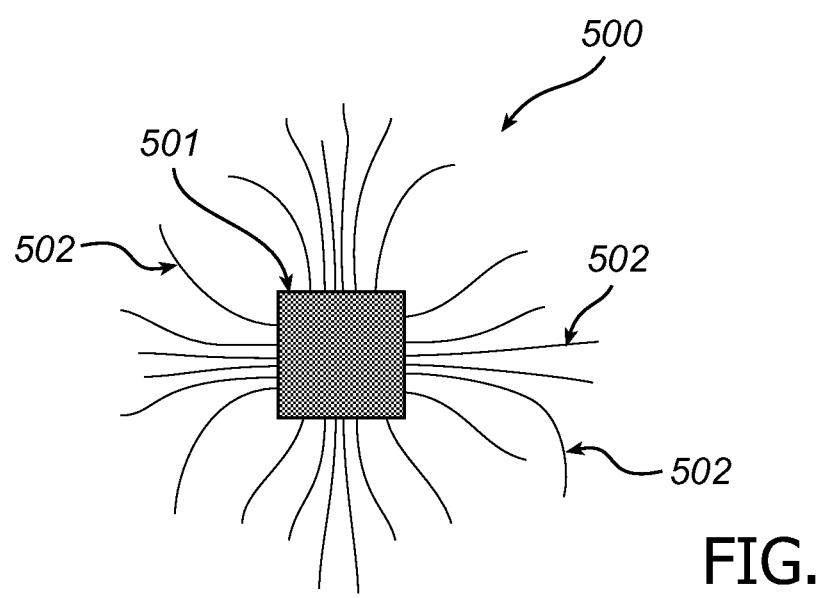
FIG. 5B is a schematic view of a light-emitting device according to an exemplifying embodiment of the present invention.

With reference to FIG. 5B, there is shown a schematic view of a light-emitting device 500 comprising an optical element 501 according to an embodiment of the present invention. The optical element comprises a plurality of optical fibers 502 (of which only some are indicated by reference numerals in FIG. 5B) for transporting light from the optical element 501. In this manner, a local light spot may be provided.

Figure 6A:
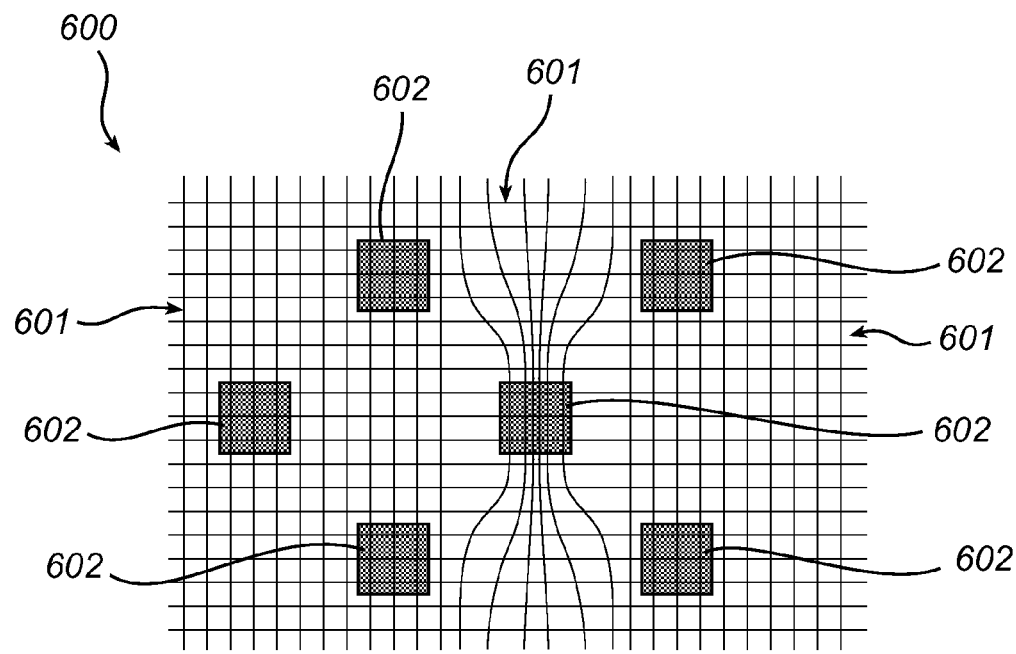
FIGS. 6A and 6B are schematic views of arrays of fibers according to exemplifying embodiments of the present invention.
Figure 6B:
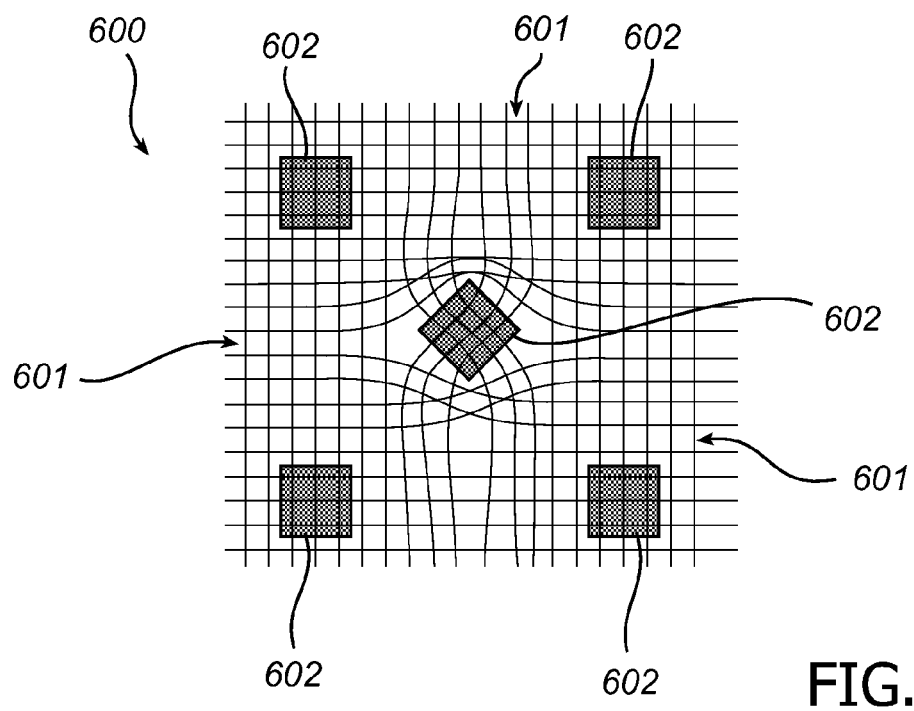

Referring to FIGS. 6A and 6B, there is illustrated how optical elements according to embodiments of the present invention can be applied in so called photonic textiles. For example, light guiding optical fibers may be combined with other fibers and be woven into a textile. The LED of each optical element may be connected to a power supply in a conventional manner, for example via textile ribbons comprising conducting yarns or via a flexible PCB (not shown in FIGS. 6A and 6B).

With reference to FIG. 6A, there is shown a schematic view of (a portion of) an array 600 of light guiding fibers 601 (of which only some are indicated by reference numerals in FIG. 6A), wherein a plurality of optical elements 602 are incorporated in the array 600. An alternative or optional array configuration is depicted in FIG. 6B.

The light-guiding fibers 601 may for example be arranged such that light may be coupled out from the light-guiding fibers 601 along the length of the light-guiding fibers 601, for example by providing the light-guiding fibers 601 with surface roughness structures or dots of phosphor/scattering paint (not shown in FIGS. 6A and 6B) or another type of light extractor.

In conclusion, it is disclosed an optical element wherein one or more LEDs and additional optics may be provided in an integrated solution that may relatively easily be assembled and maintained in a desired position relatively each other. The optical element may enable one or more LEDs and additional optics to be provided in an integrated solution that is relatively thin and compact in comparison with known devices, such that light from one or more LEDs may be injected into a thin light guide such as an optical fiber, an optical fiber array, a ribbon-shaped light-guiding structure, etc.

While the invention has been illustrated and described in detail in the appended drawings and the foregoing description, such illustration and description are to be considered illustrative or exemplifying and not restrictive; the invention is not limited to the disclosed embodiments. Other variations to the disclosed embodiments can be understood and effected by those skilled in the art in practicing the claimed invention, from a study of the drawings, the disclosure, and the appended claims. The mere fact that certain measures are recited in mutually different dependent claims does not indicate that a combination of these measured cannot be used to advantage. Any reference signs in the claims should not be construed as limiting the scope.

The invention claimed is:

1. An optical element, comprising:
   at least one light-emitting diode (LED), said LED configured to emit a light beam;
   a plurality of light guides, wherein two light guides of the plurality each comprise a longitudinal body that extends longitudinally in a direction perpendicular to said emitted light beam, wherein each of the two light guides is optically coupled to one of the other at an overlap surface portion, the overlap surface portion being arranged in a stacked configuration, wherein the bodies of the two light guides extend longitudinally from the overlap surface portion in non-overlapping directions that are non-coinciding with respect to each other, and wherein one of the two light guides comprises an input surface portion on a surface opposite the overlap surface portion, the input surface portion being arranged in a stacked configuration with respect to the overlap surface portion; a specular reflector coupled to a surface portion of the other one of the two light guides, such that with respect to a stacking direction of the overlap surface portion, the specular reflector is located opposite the input surface portion; and an optical coupler, wherein: the optical coupler is adapted to optically couple said at least one LED to the input surface portion; and the optical coupler comprises at least one light-angle selecting transflector adapted to at least partially reflect light incident on the at least one light-angle selecting transflector having an angle of incidence below a predetermined angle with respect to a surface normal of the at least one LED, and at least partially transmit light incident on the at least one light-angle selecting transflector having an angle of incidence above the predetermined angle, wherein the transmitted light is propagated through the plurality of light guides via total internal reflection.

2. An optical element according to claim 1, wherein the two light guides comprise two or more of:
   a ribbon-shaped light-guiding structure;
   a plurality of light-guiding fibers arranged substantially parallel to a longitudinal direction of at least one light guide; and
   at least one light guiding fiber arranged substantially parallel to a longitudinal direction of at least one light guide, wherein at least a portion of the at least one light-guiding fiber comprises a substantially rectangular cross section in a longitudinal direction.

3. An optical element according to claim 1, wherein the two light guides comprise a plurality of light guiding fibers arranged substantially parallel to a longitudinal direction of at least one light guide, wherein a cross section in a longitudinal direction of at least one of the light-guiding fibers has at least one of a different size and shape compared to the cross section in a longitudinal direction of other light guiding fibers.

4. An optical element according to claim 1, wherein the two light guides are extending longitudinally in directions that are orthogonal with respect to each other.

5. An optical element according to claim 1, further comprising at least one lateral specular reflector coupled to at least one lateral side surface of at least one of the two light guides.

6. An optical element according to claim 1, wherein the predetermined angle interval is such that light coupled into the two light guides satisfies a total internal reflection condition at an output surface portion of the light guide comprising said input surface portion.

7. A light-emitting device comprising an optical element according to claim 1.

8. An array of fibers comprising at least one optical element according to claim 1 incorporated into the array.

\* \* \* \* \*